United States Patent [19]

Rose et al.

[11] B 3,923,875

[45] Dec. 2, 1975

[54] PROCESS FOR PRODUCING ALKADIENOL ESTERS

[75] Inventors: David Rose, Dusseldorf-Holthausen; Herbert Lepper, Cologne-Mulheim, both of Germany

[73] Assignee: Henkel & Cie G.m.b.H., Dusseldorf, Germany

[22] Filed: July 10, 1972

[21] Appl. No.: 270,089

[44] Published under the Trial Voluntary Protest Program on January 28, 1975 as document no. B 270,089.

[30] Foreign Application Priority Data

July 26, 1971 Germany .......................... 2137291

[52] U.S. Cl.. 260/497 A; 260/410.9 N; 260/468 R; 260/475 N; 260/476 R; 260/485 N

[51] Int. Cl.[2] .......................................... C07C 67/04

[58] Field of Search ......... 260/497 A, 485 N, 475 N

[56] References Cited

UNITED STATES PATENTS

| | | | |
|---|---|---|---|
| 3,407,224 | 10/1968 | Smutney | 260/497 A X |
| 3,534,008 | 10/1970 | Bryant | 260/497 A |
| 3,562,314 | 2/1971 | Shryne | 260/497 A X |
| 3,567,762 | 3/1971 | Shier | 260/497 A X |
| 3,711,534 | 1/1973 | Manyike et al. | 260/497 A |

FOREIGN PATENTS OR APPLICATIONS

| | | | |
|---|---|---|---|
| 1,178,812 | 1/1970 | United Kingdom | 260/497 A |

*Primary Examiner*—Lorraine A. Weinberger
*Assistant Examiner*—Richard D. Kelly
*Attorney, Agent, or Firm*—Hammond & Littell

[57] ABSTRACT

A process for producing alkadienol esters comprising reacting a 1,3-conjugated acyclic diolefin with a carboxylic acid by mixed oligomerization in the presence of catalysts, the improvement consisting of conducting the process in the presence of a catalyst combination comprising a palladium and/or palladium-(II) compound and a mononuclear triarylphosphite in which at least one of the aryl radicals is substituted in the ortho position.

15 Claims, No Drawings

PROCESS FOR PRODUCING ALKADIENOL ESTERS

PRIOR ART

It is known that alkadienol esters may be produced by mixed oligomerization of conjugated dienes and carboxylic acids in the presence of catalysts. In accordance with U.S. Pat. No. 3,407,224, it is taught that 2,7-alkadienol esters are obtained by reacting butadiene and acetic acid in the molar ratio 2:1 in the presence of palladium-(II) compounds and with the addition of sodium phenolate. The acetate of octadiene-1, 7-ol-(3) is also present to a greater or lesser degree in addition to octadiene-2,7-ol-(1)-acetate. This process has the disadvantage of long reaction times, for example 22 hours at a reaction temperature of 100°C, and moderate yields of 28 to 45 percent. In accordance with German Offenlegungschrift No. 1,807,491, better yields are obtained with shorter reaction times if the reaction is carried out in the presence of a catalyst combination comprising palladium-(II) compounds and alkyl- or aryl-phosphoric and/or arsenic compounds. The essential disadvantage of this process is that large quantities of butadiene dimers (vinylcyclohexene, octatriene, methylheptatriene) are produced in addition to the desired mixed oligomerization products. U.S. Pat. No. 3,534,088 describes a process for producing alkadienol esters in which palladium-(II) compounds in combination with carboxylate ions and, if required, arsenic- and/or phosphoric organic compounds are used as catalysts. This process also requires relatively long reaction times and produces only moderate yields. In accordance with Tetrahedron Letters 43, 3817 (1970), better yields are obtained with shorter reaction times if a catalyst system is used which comprises a palladium-(II) compound and phosphine- or phosphite ligand, amines in amounts of from 0.5 to 1 equivalents per mol of the carboxylic acid to be reacted being additionally added to the reaction mixture. However, the disadvantage of this process is that the working-up of the process products is rendered expensive by the large quantity of amines added.

OBJECTS OF THE INVENTION

It is an object of the present invention to provide a process for producing alkadienol esters comprising the steps of reacting a 1,3-conjugated acyclic diolefin of 4 to 10 carbon atoms with a carboxylic acid selected from the group consisting of alkanoic acids of 2 to 12 carbon atoms, benzene dicarboxylic acids, cycloalkyl carboxylic acids of 5 to 8 carbon atoms, benzoic acid, alkanedioic acids of 2 to 12 carbon atoms, by mixed oligomerization, in the presence of a catalyst combination comprising (1) a member selected from the group consisting of (a) palladium, (b) palladium (II) compounds and (c) the mixtures thereof and (2) a mononuclear triarylphosphite having at least one aryl substituted in the ortho position by a substituent selected from the group consisting of amino, nitro, alkyl of 1 to 12 carbon atoms, haloalkyl of 1 to 12 carbon atoms, cycloalkyl of 5 to 7 carbon atoms, phenyl, tolyl, benzyl, lower alkenyl, and halophenyl; and recovering said alkadienol esters.

Other and further objects of the present invention will become apparent as the description thereof proceeds.

DESCRIPTION OF THE INVENTION

The present invention provides a process for producing alkadienol esters by mixed oligomerization of 1,3-conjugated acyclic diolefins with carboxylic acids in the presence of a catalyst combination which contains, in addition to a palladium and/or a palladium-(II) compound, a triphenylphosphite in which at least one of the aryl radicals is substituted in the ortho position by an amino group, nitro group or a hydrocarbon radical.

The present invention is particularly directed to a process for producing alkadienol esters comprising the steps of reacting a 1,3-conjugated acyclic diolefin of 4 to 10 carbon atoms with a carboxylic acid selected from the group consisting of alkanoic acids of 2 to 12 carbon atoms, benzene dicarboxylic acids, cycloalkyl carboxylic acids of 5 to 8 carbon atoms, benzoic acid, alkanedioic acids of 2 to 12 carbon atoms by mixed oligomerization, in the presence of a catalyst combination comprising (1) a member selected from the group consisting of (a) palladium, (b) palladium (II) compounds and (c) the mixtures thereof and (2) a mononuclear triarylphosphite having at least one aryl substituted in the ortho position by a substituent selected from the group consisting of amino, nitro, alkyl of 1 to 12 carbon atoms, haloalkyl of 1 to 12 carbon atoms, cycloalkyl of 5 to 7 carbon atoms, phenyl, tolyl, benzyl, lower alkenyl, and halophenyl; and recovering said alkadienol esters.

Suitable aryl substituents present in the ortho position are, in addition to amino and nitro groups, the aliphatic, cycloaliphatic and mono- or polynuclear aromatic radicals which may be unsaturated and/or substituted, for example alkyl of 1 to 12 carbon atoms such as methyl, ethyl, dodecyl, i-propyl, haloalkyl of 1 to 12 carbon atoms such as chloromethyl, cycloalkyl of 5 to 7 carbon atoms such as cyclohexyl, phenyl, alkylphenyl of 7 to 12 carbon atoms such as tolyl, phenylalkyl of 7 to 12 carbon atoms such as benzyl, lower alkenyl such as 1-propenyl and halophenyl such as chlorophenyl.

Ligands are preferred in which the aryl is phenyl and the o-substituted group is alkyl preferably such as methyl or tert. butyl, or is aryl preferably such as phenyl. It is particularly preferable to utilize those ligands in which at least three ortho substituted groups are present, such as tris-o-methyl-phenyl-phosphite, tris-o-phenyl-phenyl-phosphite, tris-o-tert.-butyl-phenyl-phosphite and corresponding di-o-substituted compounds such as tris-(2,6-dimethyl-phenyl) phosphite.

In a manner known in the literature, the said ligands may be produced by, for example, reacting phosphorous-(III)-chloride with correspondingly substituted phenols.

The molar ratio of phosphite ligands to palladium or the palladium-(II) compound in the catalyst combination is 0.1:5, preferably 0.2:2, based on the palladium content. The two components of the catalyst may be introduced separately or simultaneously into the reaction zone. In some cases, a stable complex comprising palladium and the phosphorous ligand may also be used as a catalyst.

Suitable bivalent palladium compounds to be utilized in the catalyst combination include salts of palladium with inorganic or organic acids, or palladates or palladium complexes. However it is preferred to use organic palladium compounds such as palladium acetate, palladium benzoate, or palladium acetylacetonate in the catalyst. The catalyst may also contain palladium in metallic form, for example in the form of metal applied to a carrier material, such as carbon.

The catalyst combination of palladium and/or a palladium-(II) compound and phosphite ligand is used in quantities of from 0.1 to 6, preferably 0.5 to 3, parts by weight of catalyst combination per part by weight of monomers to be reacted.

The activity of the catalyst system of the invention can be increased to a substantial extent by the presence of a promotor in the form of carboxylate ions. In addition to increasing the rate of reaction, this promotor also brings about a substantially greater selectivity of the reaction. The formation of undesirable by-products is suppressed to a very great extent.

The carboxylate ions, acting as promotors, may be added to the reaction mixture as such or in the form of salts, preferably alkali metal salts. Advantageously, in such cases, the alkali metal salt of that carboxylic acid which is to be reacted with the diene to form mixed oligomers is added. On the other hand, the promotor may be formed in situ in the reaction mixture by adding, for example, a small quantity of an alkali metal hydroxide, alkali metal carbonate, alkali metal bicarbonate or another basic inorganic compound, such as alkali metal hydride, to the reaction mixture or to the carboxylic acid to be reacted. In a further variation of the reaction process, the promotor is produced by adding to the mixture of diene, carboxylic acid and catalyst, an alkali metal salt of an acid compound which, under the selected conditions, is at least partially converted into the alkali metal salt of the carboxylic acid and does not negatively influence the reaction. Examples of such acid compounds are phenols, 1,3-diketo compounds, β-keto esters, β-keto nitriles and other substances having acid hydrogen, as well as alcohols.

Virtually all 1,3-conjugated acyclic dienes may be used as the olefinic starting materials, preferably those dienes having from 4 to 10 carbon atoms, and in particular butadiene-1,3 and its methyl substitution products such as isoprene, 2,3-dimethylbutadiene and pentadiene-1,3. These are all 1,3-alkadienes having from 4 to 10 carbon atoms.

Suitable carboxylic acid reactants include monovalent and polyvalent aliphatic, cycloaliphatic and aromatic carboxylic acids, preferably mono- and dicarboxylic acids, for example alkanoic acids of 2 to 12 carbon atoms, such as acetic acid, propionic acid, butyric acid, 2,2-dimethylpropionic acid, caprylic acid, lauric acid; benzoic acid; alkanedioic acids of 2 to 12 carbon atoms such as succinic acid and adipic acid; benzene dicarboxylic acids such as phthallic acid; and cycloalkyl carboxylic acids of 5 to 8 carbon atoms such as cyclohexanoic acid. Preferably, short-chain aliphatic carboxylic acids having from 2 to 6 carbon atoms are used as starting substances. The above-mentioned carboxylic acids may also carry substituent groups, provided that the substituent groups do not interfere with the reaction.

The reaction between the conjugated diene and carboxylic acid may be affected in a stoichiometric quantitative ratio.

It is generally carried out at temperatures from 0° to 150°C; preferably, the temperature range used is from 20° to 120°C.

The reaction pressure generally ranges from atmospheric pressure up to 100 atmospheres gauge pressure and depends primarily upon the reaction temperature and upon the specific diene used. High-boiling dienes may be readily reacted at normal pressure.

The reaction time varies with the selected reaction temperature, the reactant catalyst combination, the promotor, and upon the solvent optionally added to the reaction mixture. In the case of an intermittent process, the reaction time generally ranges from 10 minutes to about 5 hours.

In general, the process of the present invention for the mixed oligomerization of the carboxylic acids and conjugated dienes may be carried out in the absence of a solvent. However, in many cases, it may be advantageous to use a solvent which is inert under the reaction conditions. Suitable solvents are primarily hydrocarbons such as benzene, cyclohexane, n-octane, ethers such as tetrahydrofuran, dioxane, diethylether, esters such as ethylacetate, t-butylpropionate, succinic acid diethylester, and aprotic polar solvents such as dimethylformamide.

The reaction mixture present after completion of reaction may be worked up by conventional methods such as distillation, extraction or crystallization. The resultant unsaturated esters may be saponified by known processes to form unsaturated alcohols or hydrogenated to form saturated esters or alcohols. The unsaturated monoester reaction products of the present process, or the unsaturated diester reaction products obtained with the use of dicarboxylic acids, can be utilized as intermediate products for further organic syntheses. These reaction products may be used in polymerization processes optionally mixed with other substances suitable for this purpose. The epoxides which may be produced in a known manner from these reaction products are valuable raw materials for producing epoxide resins or they are suitable as plasticizers or stabilizers for polyvinylchloride resins. Owing to their allylic hydroxyl group, the unsaturated alcohols which may be produced by saponification of these reaction products are particularly active and are suitable for a large number of further reactions. An important use of the hydrogenation products, particularly of $C_8$-alkadienols, is their conversion into phthalate esters and other plasticizers.

The action of the special ligands present in the catalyst combination of the invention is entirely unexpected. Although triarylphosphite ligands are mentioned generally in the U.S. Pat. No. 3,534,088, there is no teaching or suggestion disclosed therein that higher yields can be obtained when using specific types of triarylphosphite ligands with low reaction temperatures and shortened reaction times, and that an improved selectivity results with respect to the formation of 1-acyloxyalkadiene compounds.

The present invention will be further described with reference to the following specific examples which are not to be deemed limitative in any manner thereof.

The yield data given in the following examples are based upon the carboxylic acids used. The isomer ratio between 1- and 3-acyloxyalkadienes were determined using gas-chromatography.

EXAMPLE 1

80 g. (1.5 mol) butadiene, 30 g (0.5 mol) glacial acetic acid, 1 g (0.003 mol) palladium-(II) acetyl acetonate, 1.1 g (0.003 mol) tris-o-methyl-phenyl-phosphite and 4 g (0.03 mol) sodium acetate trihydrate were introduced into an autoclave. The reaction mixture was stirred for 2 hours at 25°C and the resultant product was distilled off. The yield of acetoxyoctadienes amounted to 85 percent of theory and the isomer ratio between 1- and 3-acetoxyoctadiene was 17.1:1.

EXAMPLE 2 a. A mixture of 108 g (2.0 mol) butadiene, 60 g (1.0 mol) glacial acetic acid, 1 g (0.003 mol) palladium-(II)-acetylacetonate, 1.1 g (0.003 mol) tris-o-methyl-phenyl-phosphite, 4 g (0.03 mol) sodium acetate were heated in an autoclave to 50°C for 0.5 hours. The mixture was subsequently cooled to room temperature and the autoclave depressurized. 168 g acetoxyoctadienes, i.e. 100 percent of theory, was obtained by distilling the reaction mixture. The isomer ratio between 1- and 3-acetoxyoctadiene was 13.1:1.

b. When the experiment was repeated using a reaction temperature of 90°C and a reaction time of 2 hours, an 87 percent yield of an acetoxyoctadiene mixture was produced in which the isomer ratio between 1- and 3-acetoxyoctadiene was 7.0:1.

EXAMPLE 3

Example 2(a) was repeated except that the same molar quantity (1.8 g) of tris-o-phenyl-phenyl-phosphite was used instead of tris-o-methyl-phenyl-phosphite. The yield of acetoxyoctadiene-2,7 was 93 percent of theory; the isomer ratio between 1- and 3-acetoxyoctadiene was 11:1. The experiment was repeated at 25°C with a reaction time of 2 hours. The yield of acetoxyoctadiene was 85 percent of theory; the isomer ratio between 1- and 3-acetoxyoctadiene was 9:1.

EXAMPLE 4

54 g (1 mol) butadiene, 30 g (0.5 mol) glacial acetic acid, 5 g palladium on carbon (5 percent Pd), 1.1 g (0.003 mol) tris-o-methyl-phenyl-phosphite and 4 g (0.03 mol) sodium acetate were heated to 50°C for 2 hours in an autoclave. The yield of acetoxyoctadiene-2,7 was 76 percent. The palladium carbon recovered was used again in a fresh, identical preparation. The uniform yield of acetoxyoctadiene-2,7 showed that the catalyst had scarcely any loss of activity.

EXAMPLES 5 to 8

Using a procedure analogous to that described in the preceding examples, the dienes and carboxylic acids mentioned hereinafter were reacted in the presence of carboxylate ion promotors and a catalyst combination of 0.003 mol palladium-(II)-acetylacetonate and 0.003 mol tris-o-methyl-phenyl-phosphite, respectively, at the stated reaction temperatures and reaction times. Each preparation contained 1 mol diene and 0.5 mol carboxylic acid.

EXAMPLE 9

30 g (0.5 mol) glacial acetic acid and 54 g (1 mol) butadiene were reacted at 60°C during the course of 2 hours in the presence of 1 g (0.003 mol) palladium-(II)-acetylacetonate, 1.6 g (0.003 mol) tris-o-tert.-butyl-phenyl-phosphite and 4 g (0.03 mol) sodium acetate-trihydrate. The yield of acetoxyalkadienes was 90 percent. The isomer ratio between 1- and 3-acetoxyoctadiene was 10.5:1.

EXAMPLE 10

73 g (0.5 mol) adipic acid and 54 g (1 mol) butadiene were reacted at 90°C during the course of 2 hours in the presence of 1 g (0.003 mol) palladium-(II)-acetylacetonate, 1.2 g (0.003 mol) tris-o-methyl-phenyl-phosphite and 2 g (0.05 mol) NaOH with the addition of 100 ml acetone. 50 g of a fraction boiling at 180°C at 5 torr. were collected by distillation. This fraction was comprised by a mixture of mono- and dioctadienol esters of adipic acid.

EXAMPLE 11

54 g (1 mol) butadiene and 30 g (0.5 mol) glacial acetic acid were reacted at 50°C during the course of 2 hours in the presence of 1 g (0.0026 mol) potassium-oxalatopalladate-(II)-monohydrate, 0.95 g (0.0026 mol) tris-o-methyl-phenyl-phosphite and 4 g (0.03 mol) sodium acetate. The yield of acetoxyoctadienes was 80 percent of theory. The isomer ratio between 1- and 3-acetoxyoctadiene was 5:1.

The following experiments demonstrate the influence of the type of ligand on the isomer ratio and the influence of the carboxylate ion promotor on the isomer ratio.

COMPARATIVE EXAMPLE 12

108 g (2 mol) butadiene, 60 g (1 mol) glacial acetic acid, 1 g (0.003 mol) palladium-(II)-acetylacetonate, 1.1 g (0.003 mol) tris-p-methyl-phenyl-phosphite and 4 g (0.03 mol) sodium acetate trihydrate were heated to 90°C for 2 hours in the autoclave. The yield of acetoxyoctadiene was only 51 percent, the isomer ratio of 1- to 3-acetoxyoctadienes was 5:1.

Even smaller yields were obtained with the following ligands using an analogous process.

| Ligand | % yield of acetoxyoctadienes | isomer ratio 1- to 3-acetoxyoctadiene |
|---|---|---|
| triphenylphosphite | 15 | 3.8 : 1 |
| tris-p-chlorophenyl phosphite | 6 | 3.4 : 1 |

| Example No. | Diene | Carboxylic acid | Promotor | T(°C) | Time(h) | Acyloxy-alkadiene yield (%) | Isomer ratio of 1- and 3-acyloxy-alkadiene |
|---|---|---|---|---|---|---|---|
| 5 | butadiene | butyric acid | 0.04 mol NaOH | 50 | 3 | 75 | 16:1 |
| 6 | butadiene | glacial acetic acid | 0.03 mol Na-acetate-trihydrate | 50 | 0.5 | 80 | 11.5:1 |
| 7 | isoprene | glacial acetic acid | 0.03 mol Na-acetate-trihydrate | 90 | 4 | (25 g product mixture | — |
| 8 | butadiene | benzoic acid (+100 ml tetra-hydrofuran) | 0.028 mol Na-benzoate | 70 | 4 | 67.5 | — |

-continued

| Ligand | % yield of acetoxyoctadienes | isomer ratio 1- to 3-acetoxyoctadiene |
|---|---|---|
| trimethylphosphite | 10 | 5.8 : 1 |
| tri-n-butyl-phosphite | 7.5 | 0.03: 1 |
| tris-o-chlorophenyl-phosphite | 27 | 3.1 : 1 |
| tri-α-naphthyl-phosphite | 10.5 | 1.1 : 1 |

COMPARATIVE EXAMPLE 13

54 g (1 mol) butadiene, 30 g (0.5 mol) glacial acetic acid, 1 g (0.003 mol) palladium-(II)-acetylacetonate and 1.2 g (0.003 mol) tris-o-methyl-phenyl-phosphite were heated to 90°C for 2 hours in the autoclave. An 84 percent yield of an acetoxyoctadiene mixture was obtained in which the isomer ratio of 1-, to 3-acetoxyoctadiene was 2.9:1.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for producing alkadienol esters comprising the steps of reacting a 1,3-conjugated acyclic diolefin of 4 to 10 carbon atoms with a carboxylic acid selected from the group consisting of alkanoic acids of 2 to 12 carbon atoms, benzene dicarboxylic acids, cycloalkyl carboxylic acids of 5 to 8 carbon atoms, benzoic acid, alkanedioic acids of 2 to 12 carbon atoms by mixed oligomerization, in the presence of from 0.1 to 6 parts by weight, based on the weight of said diolefin, of a catalyst combination consisting essentially of (1) a member selected from the group consisting of (a) palladium, (b) palladium (II) compounds and (c) the mixtures thereof and (2) a triphenylphosphite containing at least 3 ortho substituents selected from the group consisting of alkyl having 1 to 4 carbon atoms and phenyl; and recovering said alkadienol esters.

2. A process as claimed in claim 1, in which the phosphite is selected from the group consisting of tris-o-methyl-phenyl-phosphite, tris-o-phenyl-phenyl-phosphite, and tris-o-tert.butyl-phenyl-phosphite.

3. A process for producing alkadienol esters comprising the steps for reacting a 1,3-conjugated acyclic diolefin of 4 to 10 carbon atoms with a carboxylic acid selected from the group consisting of alkanoic acids of 2 to 12 carbon atoms, benzene dicarboxylic acids, cycloalkyl carboxylic acids of 5 to 8 carbon atoms, benzoic acid, alkanedioic acids of 2 to 12 carbon atoms by mixed oligomerization, in the presence of from 0.1 to 6 parts by weight, based on the weight of said diolefin, of a catalyst combination consisting essentially of (1) a member selected from the group consisting of (a) palladium, (b) palladium (II) compounds and (c) the mixtures thereof and (2) a triphenylphosphite containing at least 3 ortho substituents selected from the group consisting of amino, nitro, alkyl of 1 to 12 carbon atoms, haloalkyl of 1 to 12 carbon atoms, cycloalkyl of 5 to 7 carbon atoms, phenyl, alkylphenyl of 7 to 12 carbon atoms, phenylalkyl of 7 to 12 carbon atoms, lower alkenyl, and halophenyl; and recovering said alkadienol esters.

4. The process as claimed in claim 3, further comprising the step of carrying out the reaction in the presence of a carboxylate ion.

5. The process as claimed in claim 3, in which the ortho substituent is selected from the group consisting of alkyl of 1 to 4 carbon atoms and phenyl.

6. The process as claimed in claim 3, further comprising the step of carrying out the reaction in the presence of a carboxylate ion.

7. The process as claimed in claim 3, in which the phosphite and the palladium in the catalyst combination are present in the molar ratio of substantially 0.1:5.

8. The process as claimed in claim 7, in which the phosphite and the palladium in the catalyst combination are present in a molar ratio of substantially 0.2:2.

9. The process as claimed in claim 3, in which the catalyst combination of (1)(b) is an organic palladium-(II) compound.

10. A process as claimed in claim 3, in which there are from 1 to 3 parts by weight of catalyst combination per part by weight of diolefin.

11. A process as claimed in claim 3, in which the 1,3-conjugated diolefin is butadiene-1,3, and the carboxylic acid has 2 to 6 carbon atoms.

12. A process as claimed in claim 3, in which the 1,3-conjugated diolefin is isoprene, and the carboxylic acid has 2 to 6 carbon atoms.

13. A process as claimed in claim 3, in which the reaction is carried out at a temperature of from 0° to 150°C.

14. A process as claimed in claim 13, in which the reaction is carried out at a temperature of from 20° to 120°C.

15. A process as claimed in claim 3, in which the reaction is carried out at a pressure from ambient to 100 atmospheres gauge pressure.

* * * * *